United States Patent
Nishimura et al.

(10) Patent No.: US 7,099,556 B1
(45) Date of Patent: Aug. 29, 2006

(54) VIDEO RECORDING/REPRODUCING APPARATUS WITH TUNER

(75) Inventors: Ryozo Nishimura, Kadoma (JP); Catur Henry Sunyoto, West Java (ID)

(73) Assignee: Sanyo Electric Co., Ltd., Osaka (JP)

( * ) Notice: Subject to any disclaimer, the term of this patent is extended or adjusted under 35 U.S.C. 154(b) by 897 days.

(21) Appl. No.: 09/649,594

(22) Filed: Aug. 29, 2000

(30) Foreign Application Priority Data

Aug. 30, 1999 (JP) ............................. 11-243080

(51) Int. Cl.
*H04N 5/91* (2006.01)
(52) U.S. Cl. ............................................. 386/46
(58) Field of Classification Search ............... 348/906; 455/83, 186.1, 186, 226, 234, 295, 166.1, 455/184.1; 386/46, 83, 108, 113; 725/83
See application file for complete search history.

(56) References Cited

U.S. PATENT DOCUMENTS

| | | | |
|---|---|---|---|
| 5,029,015 A | * | 7/1991 | Baxter .................... 386/108 |
| 5,278,655 A | * | 1/1994 | Jeong .................... 348/731 |
| 5,748,261 A | * | 5/1998 | Pugel .................... 348/724 |
| 5,943,467 A | * | 8/1999 | Beyers et al. .................... 386/83 |

FOREIGN PATENT DOCUMENTS

| | | |
|---|---|---|
| JP | 01-82560 | 6/1989 |
| JP | 04-132384 | 5/1992 |
| JP | 06-165052 | 6/1994 |
| JP | 06-253219 | 9/1994 |
| JP | 10-200822 | 7/1998 |
| JP | 10-276372 | 10/1998 |

* cited by examiner

*Primary Examiner*—Thai Tran
*Assistant Examiner*—Mishawn Dunn
(74) *Attorney, Agent, or Firm*—Westerman, Hattori, Daniels & Adrian, LLP.

(57) ABSTRACT

A video recording/reproducing apparatus with tuner includes a microcomputer. The microcomputer determines as to having-station/having-no-station on CH3 and CH4 that usually have no station in the U.S.A. and then sets a frequency of a channel determined as having-no-channel to an RF modulating circuit. The microcomputer also sets a frequency of CH3 or CH4 to the RF modulator circuit 22 in response to manual operation by an operator only when both CH3 and CH4 are determined as having-station. This processing is implemented prior to the processing for tuner preset.

11 Claims, 12 Drawing Sheets

VIDEO RECORDING/REPRODUCING APPARATUS WITH TUNER

BACKGROUND OF THE INVENTION

1. Field of the Invention

This invention relates generally to video recording/reproducing apparatuses with tuner and, more particularly, to a video recording/reproducing apparatus with tuner which re-modulates a television signal (base-band signal) outputted from the tuner by a frequency of a predetermined channel and then outputs a modulated television signal (radio frequency signal) to the video monitor with tuner, such as a television receiver.

2. Description of the Prior Art

The VTR (Video Tape Recorder) as one example of video recording/reproducing apparatuses with tuner has an RF output terminal provided for connection to an ANT input terminal of a television receiver. Where a television signal (base-band signal) on a channel selected by a VTR tuner is inputted to the television receiver through the RF output terminal, the television signal is modulated from a base-band signal to a radio frequency signal by a modulator circuit. At this time, where the modulation frequency is set at a frequency of CH3, the television receiver if its reception channel is set to the same CH3 provides display, on the TV screen, of a broadcast image through a channel selected by the VTR tuner. Also, where the modulation frequency is set at a frequency of CH4, the television receiver if the reception channel is set to CH4 provides display, on the TV screen, of a broadcast image through the channel selected by the VTR tuner.

Incidentally, the above explanation is on a premise that CH3 and CH4 are vacant channels (having-no-station channels) and the modulation frequency is set to the CH3 or CH4 frequency by the mechanical switch provided on the backside of the VTR.

In such a VTR, when presetting a having-station channel to a built-in tuner, the operator is required to carry out the following operations. First, the reception channel on the television receiver must be set to CH3 or CH4. Next, the VTR mechanical switch must be manipulated to set the modulation frequency to the reception channel frequency. This displays a menu picture including a tuner preset mode on the television receiver. If the operator selects a tuner preset mode, preset processing is commenced to preset a frequency of a having-station channel onto the tuner.

The prior art, however, requires the manipulation of a mechanical switch to be felt troublesome by an operator.

SUMMARY OF THE INVENTION

Therefore, it is a primary object of the present invention to provide a video recording/reproducing with tuner capable of omitting the time and labor of setting a modulation frequency.

A video recording/reproducing apparatus with tuner according to the present invention, comprises: a tuner for inputting a radio frequency television signal on a plurality of channels and outputting a base-band television signal of any one of the channels; a modulator for modulating the base-band television signal; an outputter for outputting the radio frequency television signal modulated by said modulator onto a video display with tuner; a searcher for searching a having-no-station channel from among the channels; a first setter for setting a frequency of the having-no-station channel to said modulator; and a presetter for presetting a having-station channel included in the channels to said tuner after completing frequency setting to said modulator.

When a having-no-station channel is searched from among a plurality of channels by the searcher, the first setter sets a frequency of the having-no-station channel to the modulator. After completing frequency setting to the modulator, the presetter presets a having-station channel to the tuner. The base-band television signal of a channel selected by the tuner is modulated in modulator by a frequency of the having-no-station channel. Then, a modulated radio frequency television signal is outputted to the video displayer by the outputter.

Because the searcher searches a having-no-station channel from among a plurality of channels and then the first setter sets a frequency of a searched having-no-station channel to the modulator, labor and time for modulation frequency setting is to be significantly reduced.

In one aspect of the invention, if instruction is given to suspend preset after completing the frequency setting to the modulator, a disabler disables the presetter.

In another aspect of the invention, the searcher includes a determiner to determine as to having-station/having-no-station for predetermined channels that should not have a station. The first setter sets a frequency of any one of the predetermined channels based on a result of determination by the determiner.

In one embodiment of the invention, a first displayer selectively displays channel numbers of the predetermined channels at a predetermined time interval when each of the predetermined channels is not determined as having-no-station. Here, if a selector selects any of the predetermined channels, a second setter sets a frequency of channel selected by the selector to the modulator. In another embodiment of the invention, a second displayer displays a channel number of a frequency having been set in the modulator.

In another aspect of the invention, a generator generates a character signal and combiner combines the generated character signal with the base-band television signal. Third setter selectively sets frequencies of the predetermined channels to the modulator at a predetermined time interval.

In one embodiment of the invention, a controller controls the generator to generate a character signal related to a frequency having been set by the third setter. Consequently, the character to be displayed on the video display device with tuner differs depending on a channel. In another embodiment of the invention, a third displayer displays a channel number of a frequency having been set by the third setter.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
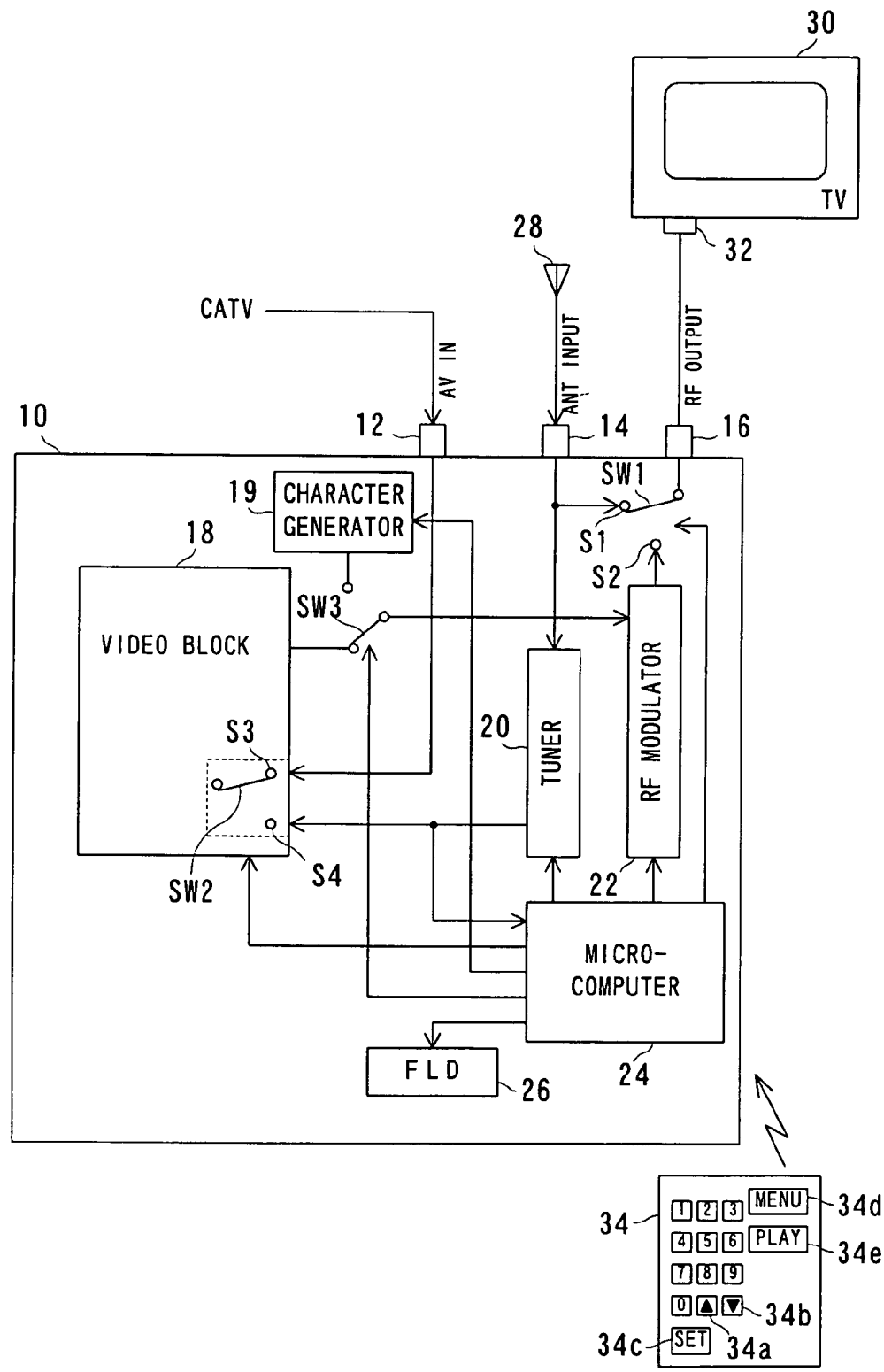
FIG. 1 is a block diagram showing one embodiment of the present invention.

Referring to FIG. 1, a VTR 10 of this embodiment includes an AV input terminal for inputting a television signal (base-band signal) outputted from a CATV tuner (not shown), an ANT input terminal 14 for inputting a television signal (radio frequency signal) through a plurality of channels received by an antenna 28, and an RF output terminal 16 for outputting a television signal (radio frequency signal).

If an operator selects a CATV mode by a MENU button 34d on a remote control device 34 in order to view a CATV broadcast program on a television receiver 30, a switch SW2 is brought into connection to a terminal S3. This fetches a CATV broadcast television signal inputted through the AV input terminal 12 to a video block 18 through the switch SW2. The video block 18 outputs the fetched television signal directly to an RF modulator circuit 22. The RF modulator circuit 22 is set with a frequency of CH3 or CH4 (each having-no-station channel) of television broadcast channels in the U.S.A. Consequently, the television signal (base-band signal) outputted from the video block 18 is modulated by the frequency of CH3 or CH4. During viewing a CATV broadcast program, a switch SW1 is connected to a terminal S2 with a result that a television signal (radio frequency signal) modulated by the RF modulator circuit 22 is outputted through the RF output terminal.

The television receiver 30 takes therein the output television signal on the RF output terminal 16 through the ANT input terminal 32. Consequently, if a tuner circuit (not shown) of the television receiver 30 is set to CH3 or CH4, a video image corresponding to the fetched television signal (CATV broadcast program) is displayed on the TV screen. That is, in the case that a CH3 frequency is set in the RF modulator circuit 22, when CH3 is set to the tuner circuit, a CATV broadcast program is displayed on the TV screen. Where a CH4 frequency is set in the RF modulator circuit 22, when CH4 is set to the tuner circuit, a CATV broadcast program is displayed on the TV screen.

If the operator selects a TV mode by the menu button 34d, the switch SW1 is connected to the terminal S1. The television signal (radio frequency signal) on a plurality of channels received by the antenna 28 is directly outputted from the RF output terminal 16 through the ANT input terminal 14 and switch SW1. Consequently, if a desired channel is set to the tuner circuit on the television receiver 30 side, a program being broadcast through the channel in setting is displayed on the TV screen.

On the other hand, if the operator selects a VTR mode by the MENU button 34d, the switch SW1 is connected to the terminal S2 and the switch SW2 to the terminal S4. Consequently, the television signal of a plurality of channels received by the antenna 28 is processed as follows. First, by setting a desired channel frequency to the tuner circuit 20, a television signal being broadcast at that frequency is selected and demodulated into the base-band. The demodulated television signal is taken in the video block 18 through the switch SW2.

The video block 18 outputs the fetched television signal directly to the RF modulator circuit 22, similarly to the above. The RF modulator circuit 22 modulates the input television signal by the CH3 or CH4 frequency. Because the switch SW1 is in connection to the terminal S2, the television signal (radio frequency signal) outputted from the RF modulator circuit 22 is outputted through the RF output terminal 16 to the television receiver 30. Consequently, if CH3 or CH4 (same frequency as the RF modulator circuit 22) is set to the tuner circuit on the side of the television receiver 30, a desired broadcast program is displayed on the TV screen.

In the VTR mode, if the operator presses a REPRODUCE button 34e, a television signal recorded on a videocassette (not shown) is reproduced by the video block 18. The reproduced television signal is outputted to the television receiver through the RF modulator circuit 22, similarly to the above. Consequently, by setting CH3 or CH4 to the tuner circuit on the television receiver 30 side, a video image reproduced from the videocassette is displayed on the TV screen.

The RF modulator circuit 22 has a modulation frequency to be set by a microcomputer 24. That is, when the power to the VTR 10 has been turned on for the first time after purchase or the microcomputer 24 has run out of power supply backup and its setup information has been cleared, the microcomputer processes a flowchart shown in FIG. 2 and FIG. 3. This sets a frequency corresponding to the CH3 or CH4 broadcast channel to the RF modulator circuit 22.

Figure 2:
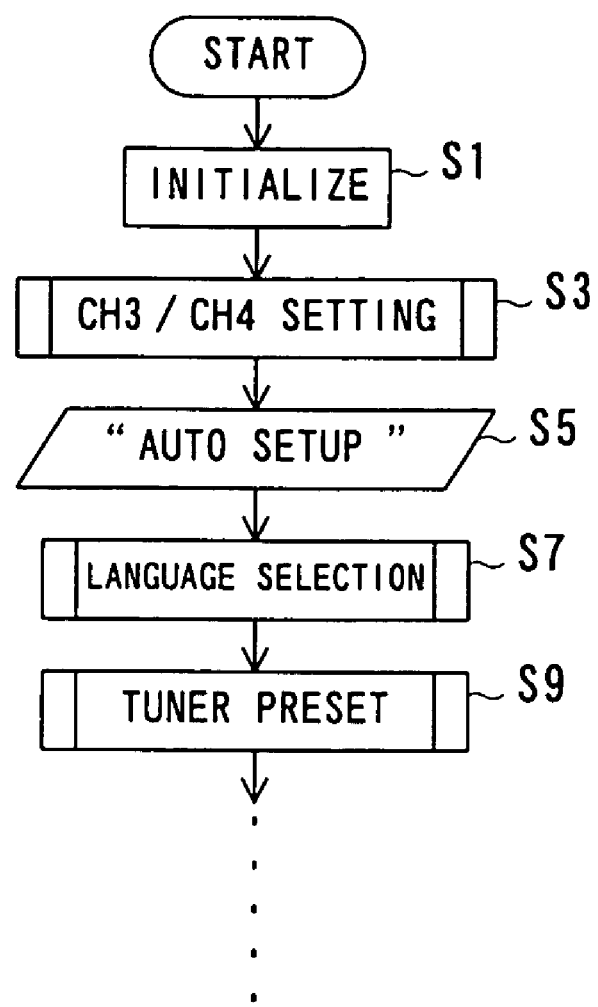
FIG. 2 is a flowchart showing one part of operation of the FIG. 1 embodiment.
Figure 4:
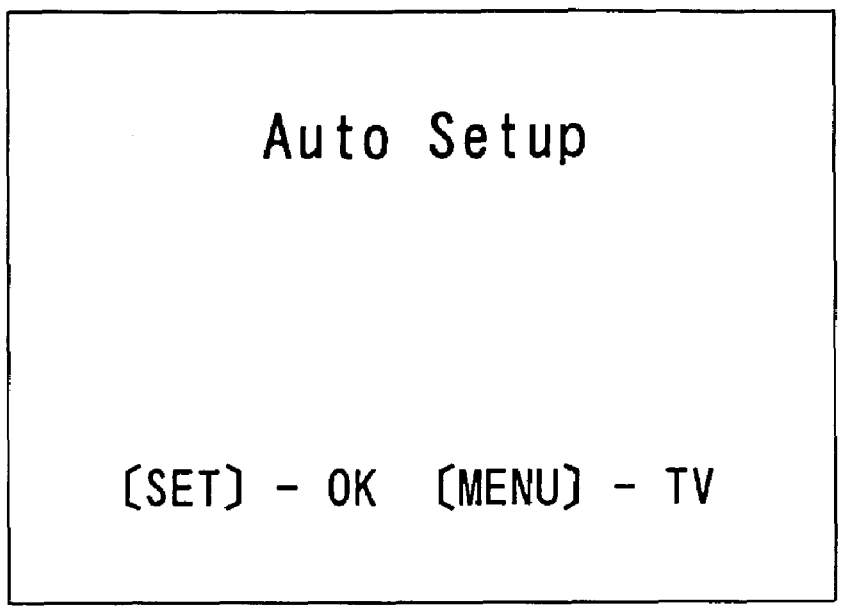
FIG. 4 is an illustrative view showing one example of characters to be displayed on a TV screen picture.

Referring to FIG. 2, the microcomputer 24 first performs initialization in step S1 and then CH3/CH4 setting processing in step S3. After setting a CH3 or CH4 frequency to the RF modulator circuit 22, the microcomputer 24 proceeds to step S5 to OSD-display on the TV screen a guide showing channel set completion as shown in FIG. 4. The OSD display is made feasible by instructing a character generator 19 to generate a corresponding character signal, superposing (combining) a generated character on a television signal through the switch SW3, and setting a same frequency as that of the RF modulator circuit 22 to the tuner circuit on the television receiver 30 side.

If the operator herein presses a SET button 34c on the remote control device 34, the microcomputer 24 starts processing of step S7 and the subsequent. In the step S7 language select processing is made, and in step S9 tuner preset processing is performed. The language select processing is to select a language of a guide to be OSD-displayed, on the TV screen, from among a plurality of previously prepared languages. The tuner preset processing is to search a having-station channel being actually broadcast with television signals among a plurality of broadcast channels provided in a predetermined frequency band range and save channel information of the having-station channel to a memory such as an EEPROM. This enables prompt selection of a station by the tuner circuit 20. Note that the EEPRPOM is provided in the tuner circuit 20 or at an inside or outside of the microcomputer 24.

On the other hand, when a guide shown in FIG. 4 is being displayed on the TV screen, if the operator presses the MENU button 34d, the microcomputer 24 suspends the processing of the step S7 and the subsequent and then enters swiftly into the TV mode. As a result, if the switch SW1 is connected to the terminal S1 and a desired channel is selected on the television receiver 30 side, a program in broadcast through the selected channel is displayed on the TV screen.

Figure 3:
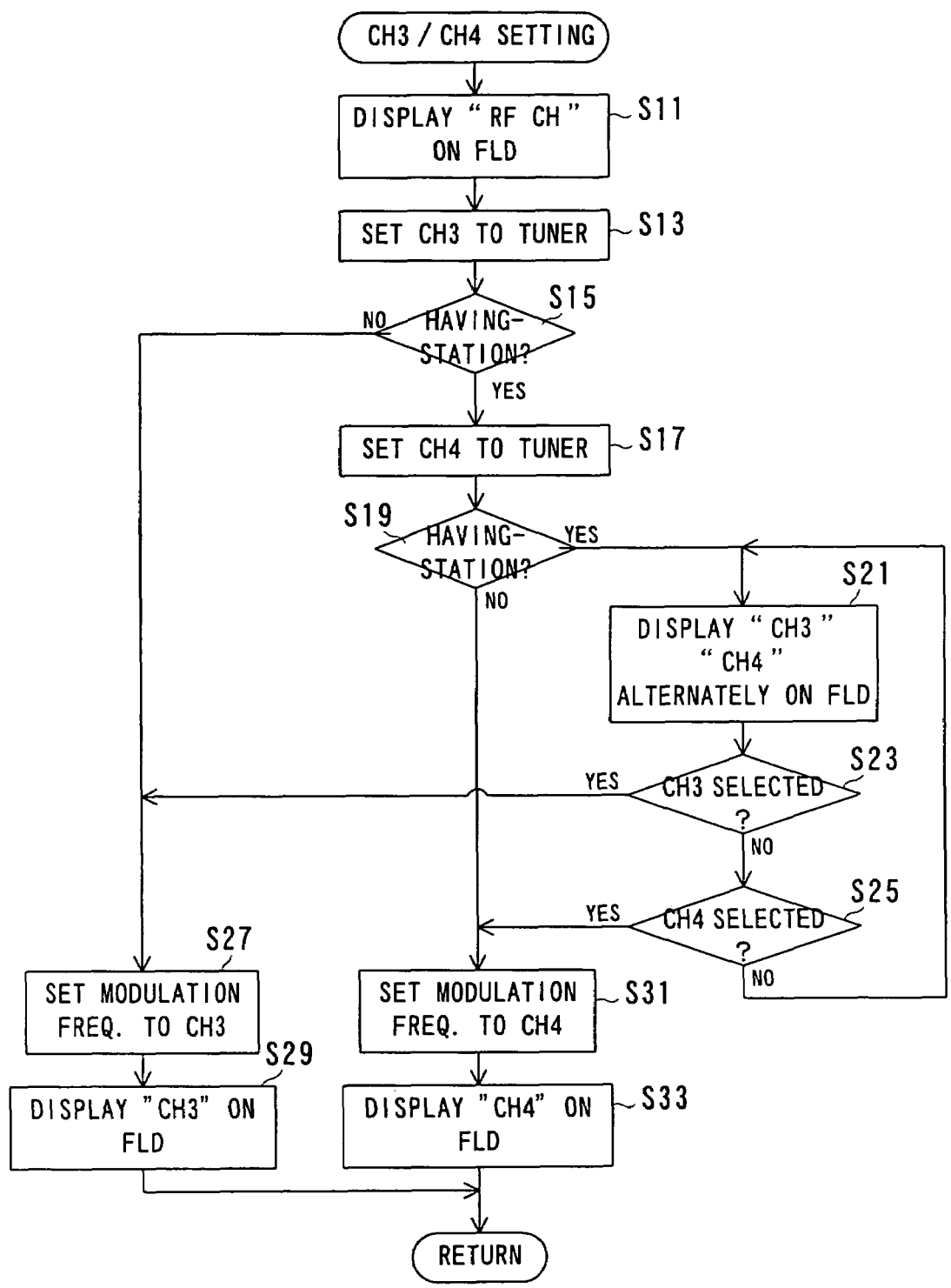
FIG. 3 is a flowchart showing another part of operation of the FIG. 1 embodiment.

The microcomputer 24 in step S3 processes a subroutine shown in FIG. 3. First, in step S11 a character "RF CH" is displayed on an FLD (Fluorescent Display) 26. Next, in step S13 a CH3 frequency is set to the tuner circuit 20. In step S15, an output of the tuner circuit 20 is taken into determined whether CH3 is a having-station channel or not. If an occupied channel, the process advances to step S27 while if a having-station channel, the process proceeds to step S17.

When advancing to step S27, the microcomputer 24 in this step sets a CH3 frequency to the RF modulator circuit 22 and in the succeeding step S29 displays "CH3" on the FLD 26. Then, the process returns to the main routine shown in FIG. 2. On the other hand, when advancing to the step S17, a CH4 frequency is set to the tuner circuit 20, and in the succeeding step S19 it is determined based on an output of the tuner circuit 20 whether CH4 is a having-no-station channel or not. If CH4 is a having-station channel, then in step S31 a CH4 frequency is set to the RF modulator circuit 22. In the succeeding step S33 "CH4" is displayed on the FLD 26. Then, the process returns to the main routine of FIG. 2.

In the case that CH4 is a having-station channel in step S19, the microcomputer 24 advances to step S21 to alternately display "CH3" and "CH4", for example, at an interval of 1 second. It is then determined in steps S23 and S25 which one of CH3 and CH4 has been selected. If the operator presses a down cursor button 34b, the microcomputer 24 determines that CH3 has been selected, and advances from step S23 to step S27. On the other hand, if the operator presses an up cursor button 34a, the microcomputer 24 determines that CH4 has been selected, and advances from step S25 to step S27. Neither of the cursor buttons 34a nor 34b is depressed, the microcomputer 24 returns to the step S21.

According to the processing of FIG. 3, if both of CH3 and CH4 or CH3 is a having-no-station channel, a frequency of CH3 is automatically set to the RF modulator circuit 22. If the CH3 is a having-station channel and CH4 is a having-no-station channel, a frequency of CH4 is automatically set to the RF modulator circuit 22. If both CH3 and CH4 are having-station channels, any one of the CH3 and CH4 frequencies is set to the RF modulator circuit 22 according to an instruction by the operator. When any of the frequencies are set to the RF modulator circuit 22, a character corresponding to the channel is displayed on the FLD 26. Furthermore, by setting a same channel as the channel displayed on the FLD 26 is set to the tuner circuit on the television receiver 30 side, a character shown in FIG. 4 is OSD-displayed on the TV screen.

In this embodiment, determination was made as to having-station/having-no-station on CH3 and CH4 that ordinarily have no stations in the U.S.A. A frequency of a channel determined as having-no-station is automatically set to the RF modulator circuit. Only where the both are determined having-station, a frequency is set according to manual operation by the operator. Therefore, it is possible to reduce the labor and time for setting a modulation frequency to a minimal extent. Also, because a channel number set in the RF modulator circuit is displayed on the FLD, the operator can easily know which channel has been set in the RF modulator circuit. Furthermore, as understood from FIG. 2, CH3/CH4 set processing is carried out prior to the tuner preset processing. This makes the processing of FIG. 2 complete in a short time where the VTR is used only as an exclusive reproducer, i.e. tuner preset processing is unnecessary. This effect is to be reflected upon more conspicuously as the number of having-station channels increases.

Figure 5:
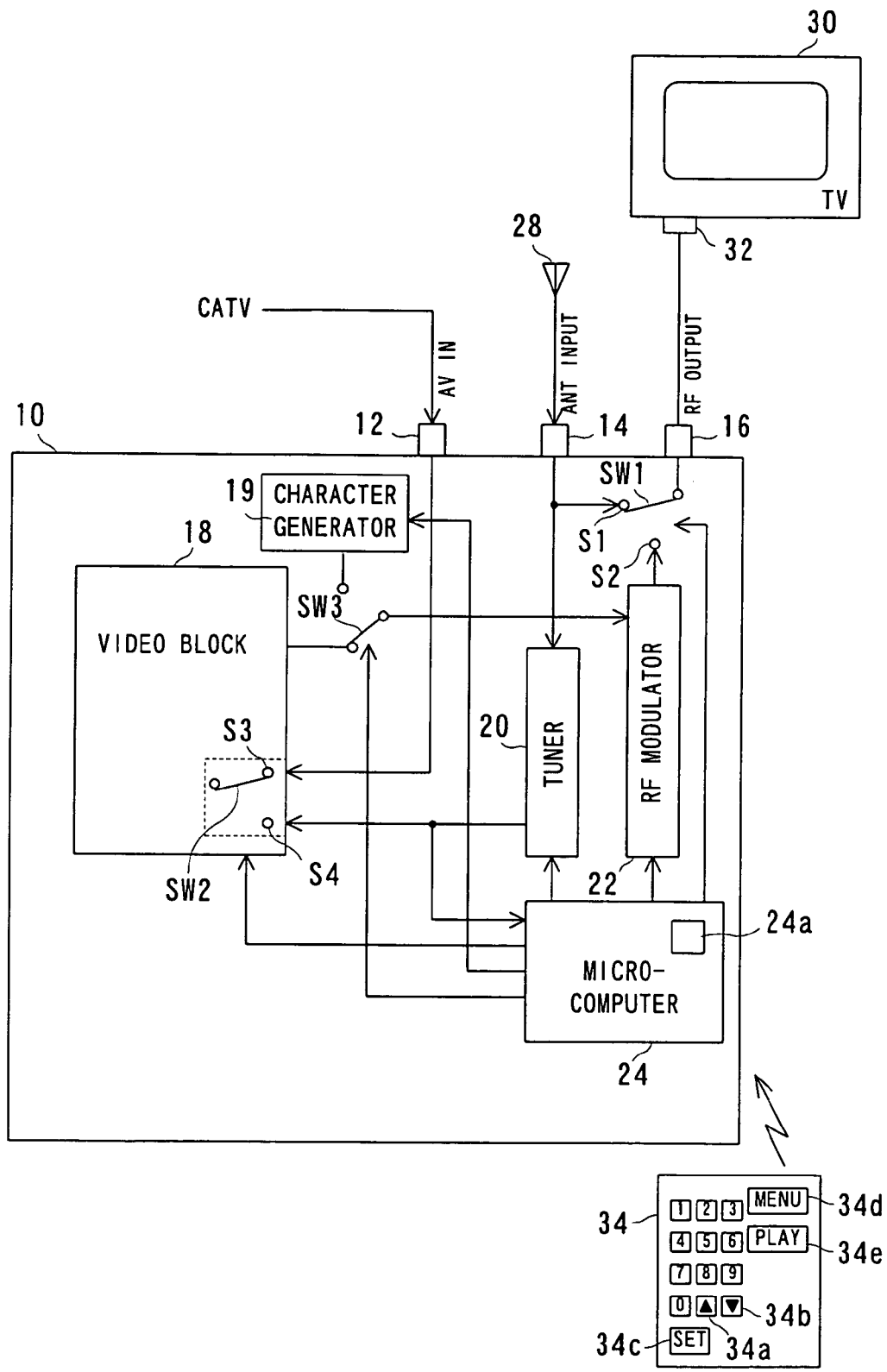
FIG. 5 is a block diagram showing another embodiment of the invention.
Figure 6:
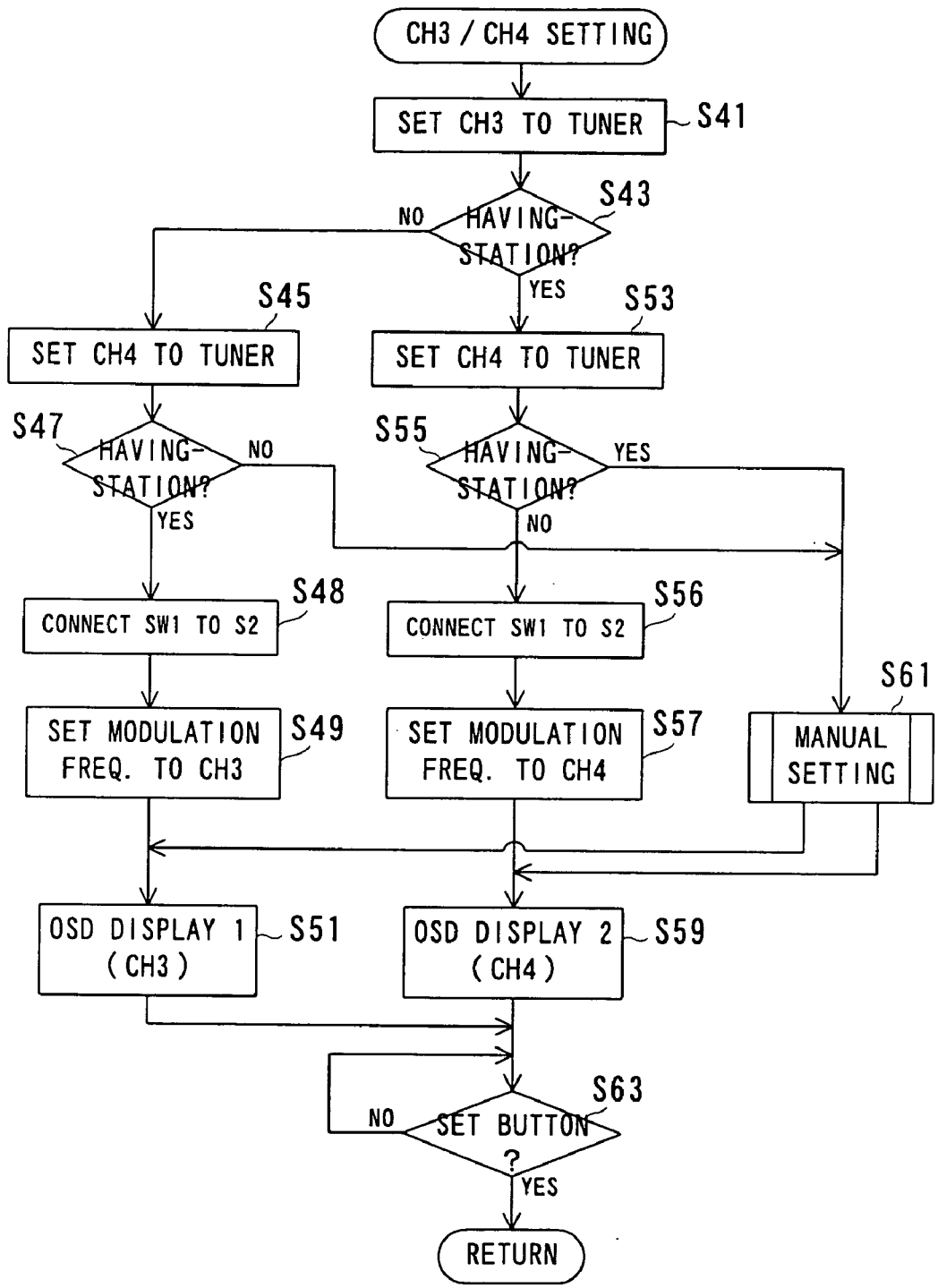
FIG. 6 is a flowchart showing one part of operation of the FIG. 5 embodiment.
Figure 7:
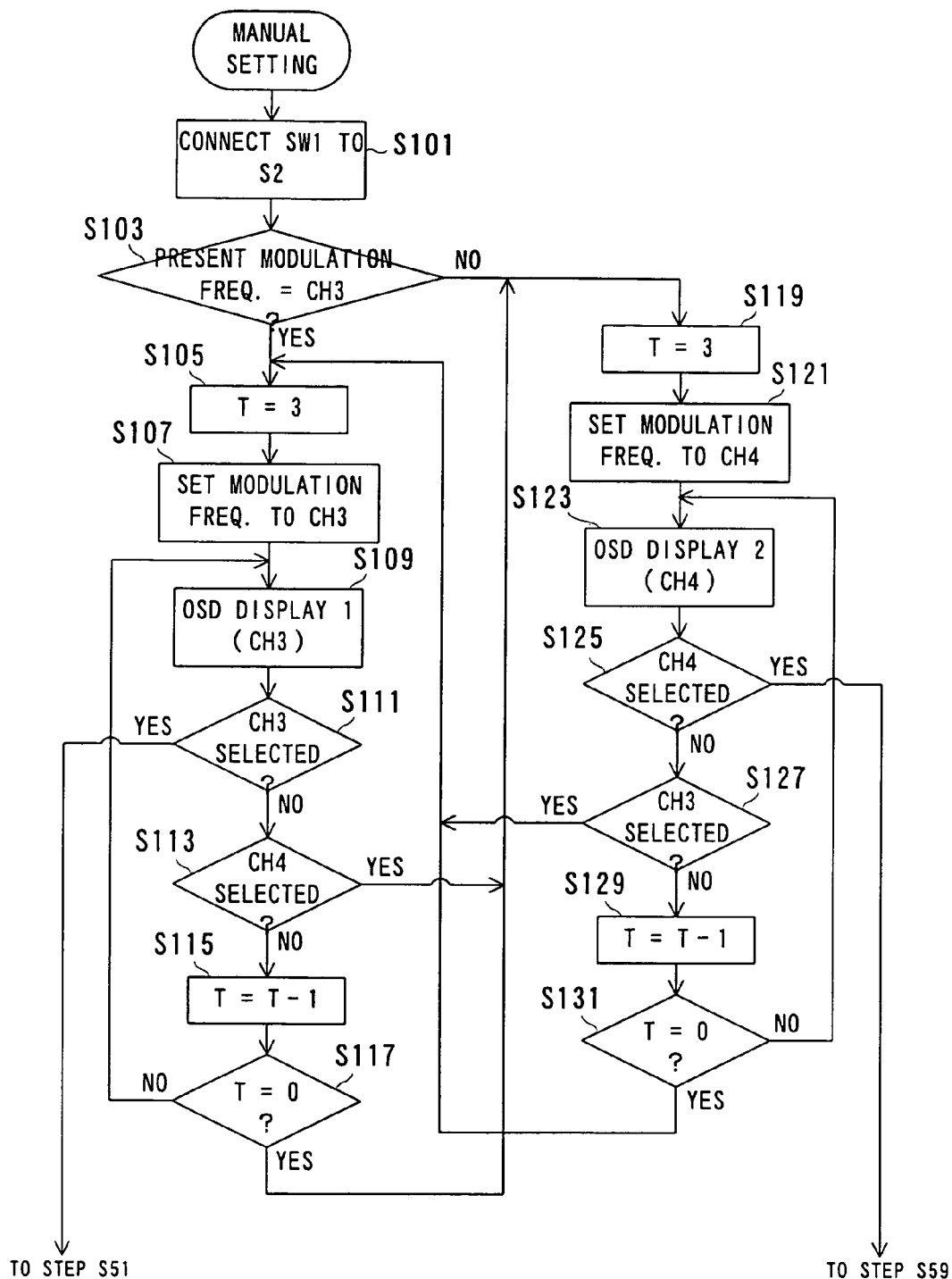
FIG. 7 is a flowchart showing another part of operation of the FIG. 5 embodiment.

Referring to FIG. 5, a VTR 10 of another embodiment is similar to the FIG. 1 embodiment excepting that no FLD is provided and a flowchart shown in FIG. 6 and FIG. 7 is processed in the step S3 of FIG. 2. Hence, duplicated explanations will be omitted as much as possible.

Figure 8:
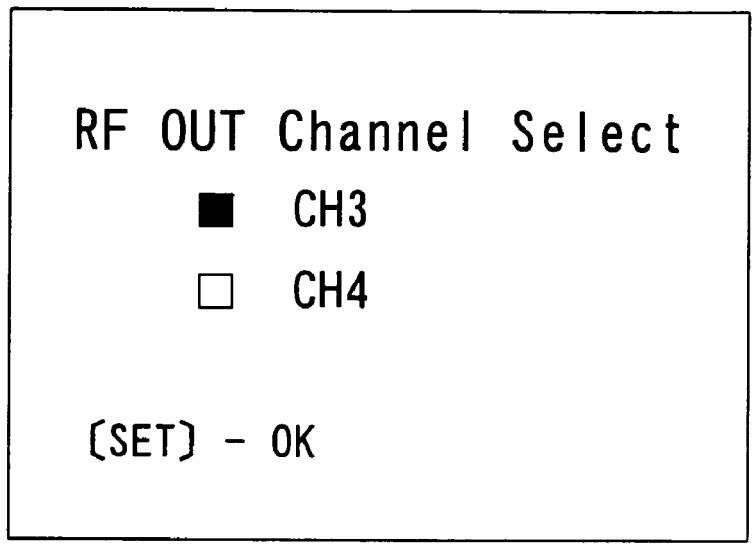
FIG. 8 is an illustrative view showing one example of characters to be displayed on the TV screen.
Figure 9:
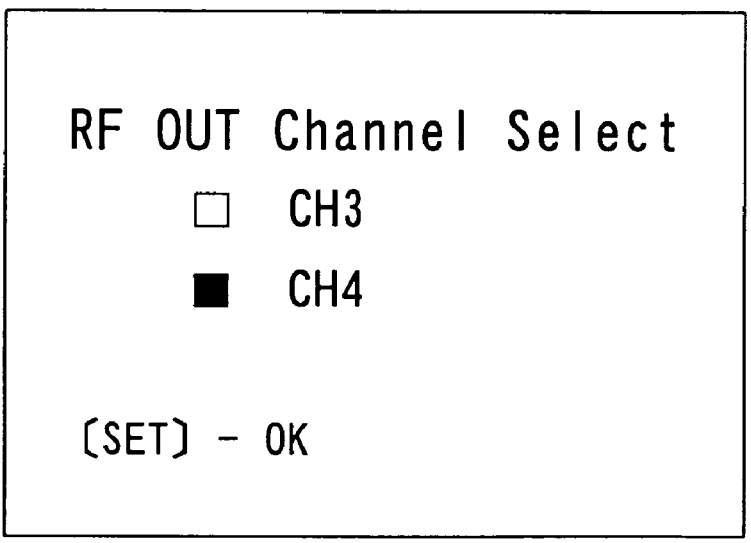
FIG. 9 is an illustrative view showing another example of characters to be displayed on the TV screen.

Referring to FIG. 6, the microcomputer 24 first in step S41 sets a frequency of CH3 to the tuner circuit 20 and in step S43 determines whether CH3 is having-station or not. If CH3 herein is having-station, the microcomputer 24 in step S45 sets a frequency of CH4 to the tuner circuit 20 and in step S47 determines as to having-station/having-no-station on the CH4. If the CH4 is having-station, microcomputer 24 in step S48 connects the switch SW1 to the terminal S2 and in step S49 sets the CH3 frequency to the RF modulator circuit 22. Further, the microcomputer 24, in the succeeding step S51, OSD-displays a character of FIG. 8 (a guide for setting the CH3 frequency to the RF modulator circuit 22). In step S51, the character generator 19 is caused to output a character signal corresponding to the character of FIG. 8, and the switch SW3 is controlled to superpose the character signal over the television signal. Thereafter, it is determined in step S63 whether the set button 34c has been pressed or not. If "YES", the process returns to the main routine of FIG. 2. Incidentally, if CH4 in step S47 is determined as having-no-station, the microcomputer 24 advances to step S61.

Where CH3 in step S43 is determined having-station, the microcomputer 24 in steps S53 and S55 performs the same processing as that of the above steps S45 and S47. If "NO" in the step S55, then in step S57 the CH4 frequency is set to the RF modulator circuit 22 and in step S58 the switch SW1 is connected to the terminal S2. In step S59, the character shown of FIG. 9 (guide for setting the CH4 frequency to the RF modulator circuit 22) is OSD-displayed on the TV screen. In the step S59, the character generator 19 is caused to output a character signal corresponding to the character of FIG. 9 similarly to the above, and the switch SW3 is controlled to superpose the character signal over the television signal. Then, the process advances to step S63. If the operator presses the SET button 34c, the process returns to the main routine. Incidentally, if "YES" in the step S55, the process proceeds to step S61 similarly to the case of determination of NO in the step S47.

In the step S61 a subroutine shown in FIG. 7 is processed. The microcomputer 24 first in step S101 connects the switch SW1 to the terminal S2 and in step S103 determines a frequency now being set in the RF modulator circuit 22. If this frequency corresponds to that of CH3, then the microcomputer 24 advances to step S105 while if the frequency corresponds to CH4 the microcomputer 24 proceeds to step S119.

In step S105, the count value T of a counter 24a is set to "3". In the succeeding step S107 the CH3 frequency is set to the RF modulator circuit 22, and in step S109 a character shown in FIG. 10 (guide notifying the CH3 frequency is set in the RF modulator circuit) is OSD-displayed on the TV screen. If the operator herein selects CH3, i.e. presses a down cursor key 34b, the microcomputer 24 determines "YES" in step S111 and returns to the step S51. On the other hand, if the operator selects CH4, i.e. presses an up cursor key 34*a*, the microcomputer 24 in step S113 determines "YES" and advances to step S119. If the operator does not select any of CH3 and CH4, the microcomputer 24 in step S115 decrements the counter 24*a* and in step S117 determines whether the count value T has reached "0". If "NO", the process returns to the step S109 while if "YES", the process advances to step S119.

In the step S119, the count value T of the counter 24*a* is set to "3" similarly to the step S105. The microcomputer 24 subsequently in step S121 sets the CH4 frequency to the RF modulator circuit 22, and in step S121 OSD-displays on the TV screen a character shown in FIG. 11 (guide notifying that the CH4 frequency is set in the RF modulator circuit). If the operator herein selects CH4, the microcomputer 24 in step S125 determines "YES" and returns to the step S59. On the other hand, if the operator select CH3, the microcomputer 24 in step S127 determines "YES" and returns to the step S105. If the operator does not select any of CH3 and CH4, the microcomputer 24 in step S129 decrements the counter 24*a* and in step S131 determines whether the count value has reached "0" or not. If "NO", the process returns to the step S123 while if "YES", the process returns to the step S105.

Figure 10:
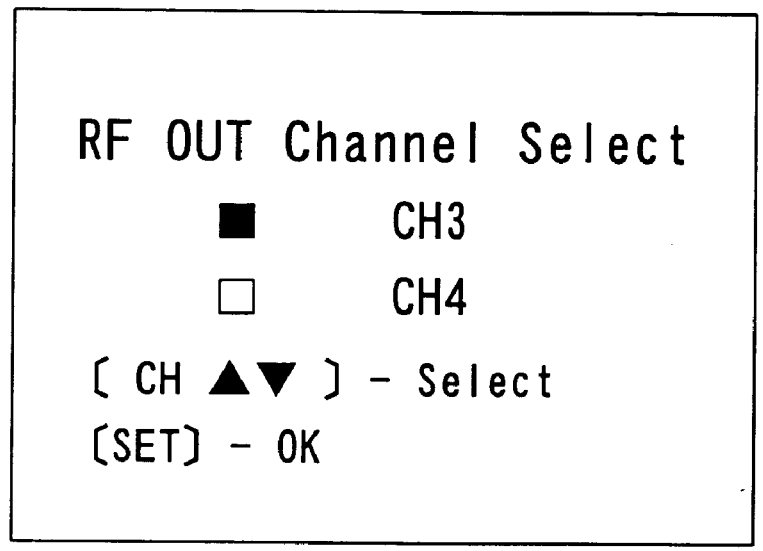
FIG. 10 is an illustrative view showing another example of characters to be displayed on the TV screen.
Figure 11:
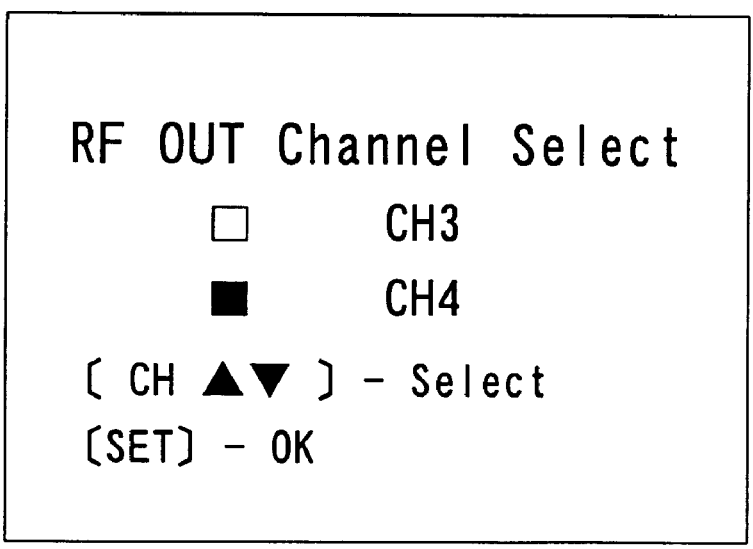
FIG. 11 is an illustrative view showing still another example of characters to be display on the TV screen.

In this manner, in a state that the character of FIG. 10 is being displayed, the cursor key 34*b* is not pressed before the count value T reaches "0", the process moves to the step S119. In also a state that the character of FIG. 11 is being displayed, the cursor key 34*a* is not pressed before the count value T reaches "0", the process returns to the step S115. That is, unless determining "YES" in the step S111 or "YES" in the step S125, the processing of the steps S105–S117 and the processing of the steps Ss119–S131 are executed alternately.

Accordingly, where the operator has set CH3 to the tuner circuit on the television receiver 30 side, the character of FIG. 10 is OSD-displayed intermittently on the TV screen. If the operator sets CH4 to the same tuner circuit, the character of FIG. 11 is OSD-displayed intermittently on the TV screen.

According to this embodiment, despite an FLD is not provided on the VTR, a guide for channel setting is OSD-displayed on the TV screen. Thus, the operator can easily recognize as to which channel frequency is set in the RF modulator circuit. Also, in manual setting, a similar guide to the above is displayed intermittently on a CH3 and CH4 screen. Consequently, when the reception channel on the television receiver side is set at any of CH3 and CH4, channel setting is possible to carry out according to the guide.

Figure 12:
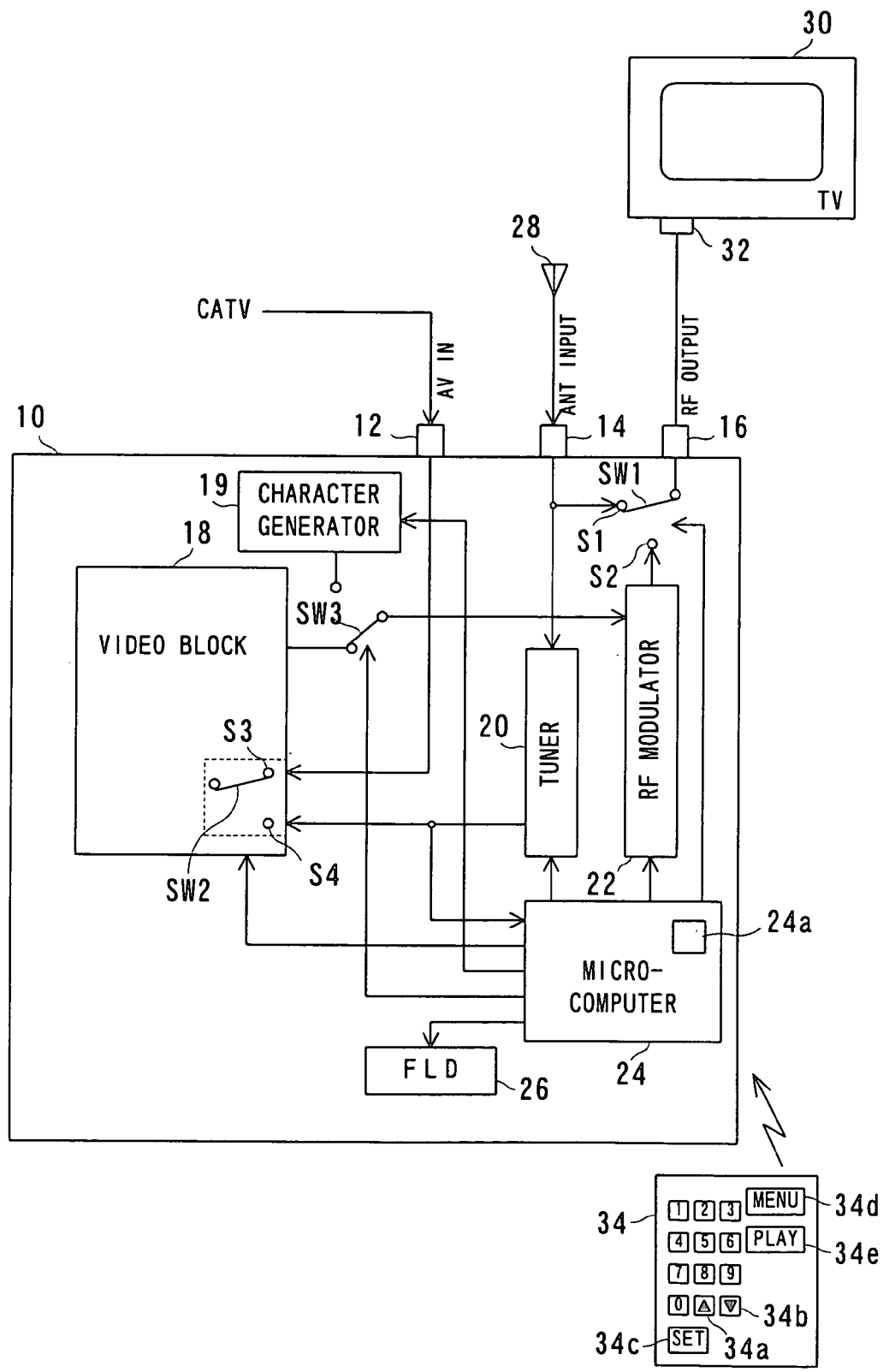
FIG. 12 is a block diagram showing still another embodiment of the invention.
Figure 13:
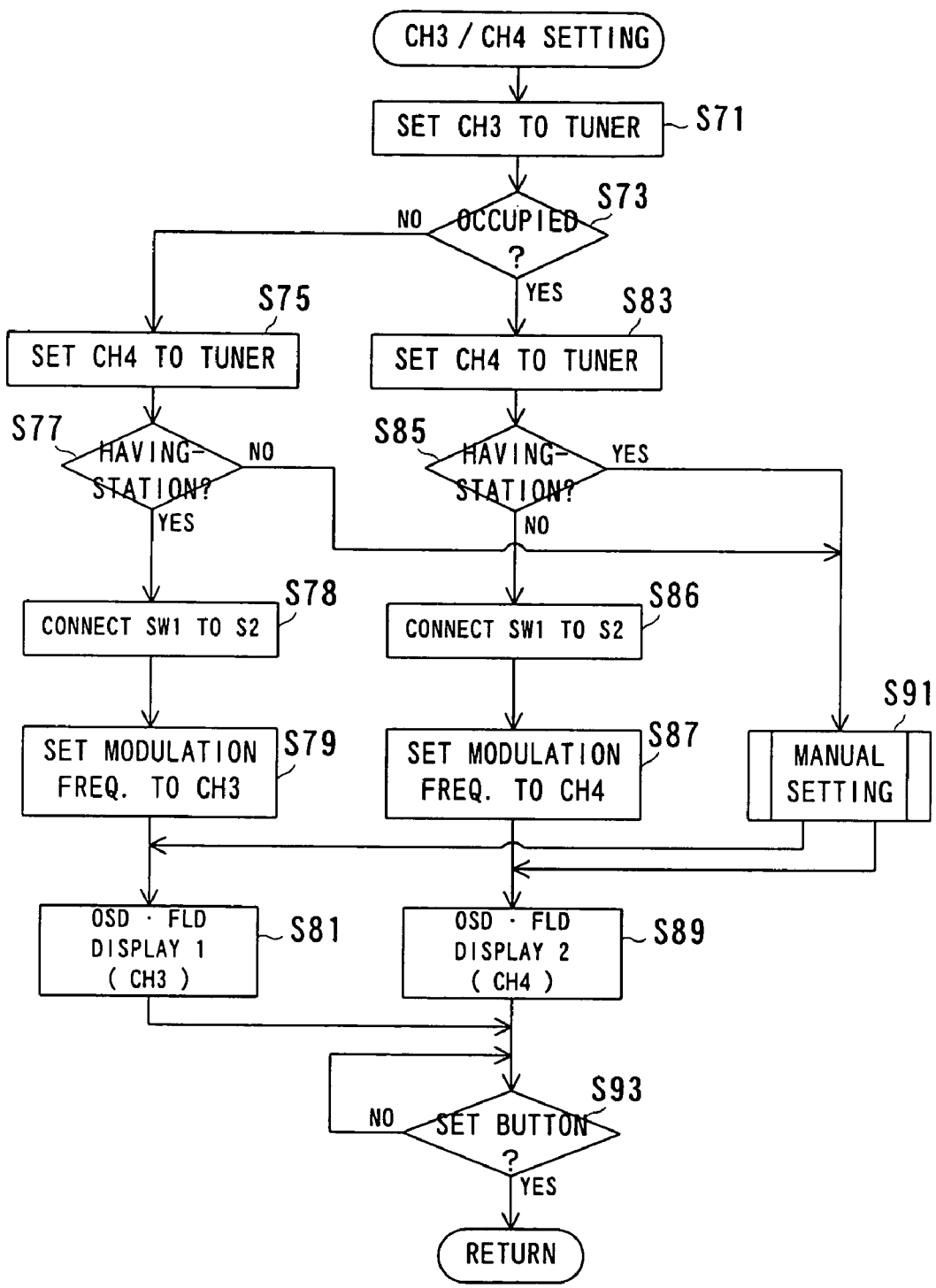
FIG. 13 is a flowchart showing one part of operation of the FIG. 12 embodiment.
Figure 14:
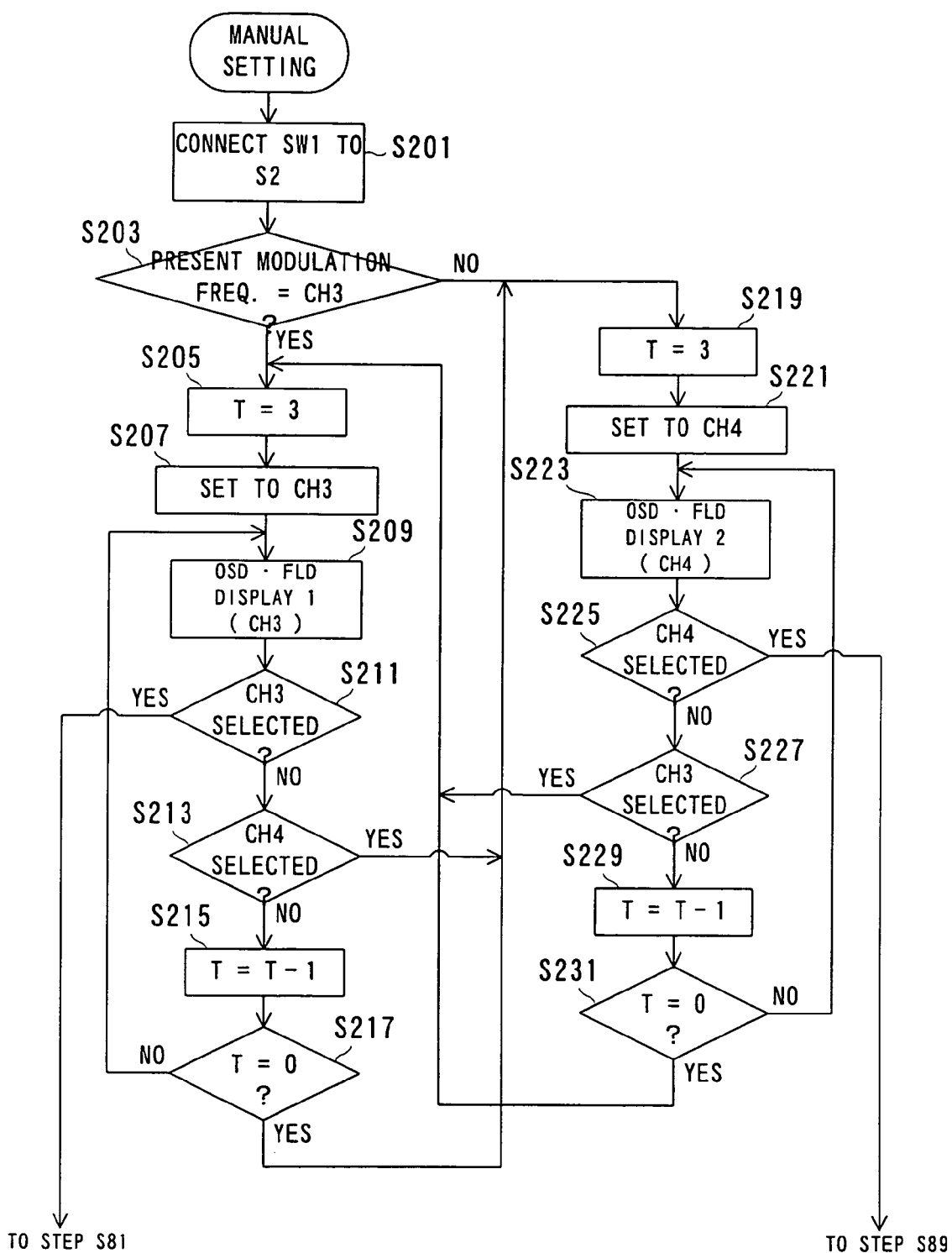
FIG. 14 is a flowchart showing another part of operation of the FIG. 12 embodiment.

Referring to FIG. 12, a VTR 10 of another embodiment has an FLD 26 similarly to the FIG. 1 embodiment. The microcomputer 24 processes a flowchart shown in FIG. 13 and FIG. 14. However, as will be understood from FIG. 13 and FIG. 14, in step S81 a character for "CH3" will be displayed on the FLD 26 in addition to OSD-displaying the character of FIG. 8, and in step S89 a character for "CH4" is displayed on the FLD 26 in addition to OSD-displaying the character of FIG. 9. Also, in step S209 the "CH3" character is displayed on the FLD 26 in addition to OSD-displaying the character of FIG. 10, and in step S223 the "CH4" character is displayed on the FLD 26 in addition to OSD-displaying the character of FIG. 11.

This embodiment uses both of FLD display and OSD display. Thus, operation is facilitated for an operator.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A video recording/reproducing apparatus with tuner, comprising:
   a tuner for inputting a plurality of channels of radio frequency television signals and outputting a base-band television signal of a designated channel;
   a modulator for modulating the base-band television signal outputted from said tuner;
   an outputter for outputting the radio frequency television signal modulated by said modulator to a video displaying apparatus with tuner;
   a searcher for searching an unused channel from among the plurality of channels, said searcher including a determiner to determine a used/unused status for predetermined channels that should be the unused channel;
   a first setter for setting a frequency of the unused channel detected by said searcher to said modulator, said first setter setting a frequency of any one of the predetermined channels based on a result of determination by said determiner;
   a presetter for presetting a used channel included in the plurality of channels to said tuner after completing a frequency setting operation by said first setter;
   a first displayer for selectively displaying channel numbers of the predetermined channels at a predetermined time interval when each of the predetermined channels is not determined as having the unused status by said determiner;
   a selector for selecting any one of the predetermined channels; and
   a second setter for setting a frequency of a channel selected by said selector to said modulator.

2. A video recording/reproducing apparatus with tuner according to claim 1, further comprising:
   an instructor for instructing suspension of a presetting operation, which is to be enabled after completing the frequency setting operation by said first setter; and
   a disabler for disabling said presetter in response to an instruction of said instructor.

3. A video recording/reproducing apparatus with tuner according to claim 1, further comprising a second displayer for displaying a channel number of a frequency having been set in said modulator.

4. A video recording/reproducing apparatus with tuner, comprising:
   a tuner for inputting a plurality of channels of radio frequency television signals and outputting a base-band television signal of a designated channel;
   a modulator for modulating the base-band television signal outputted from said tuner;
   an outputter for outputting the radio frequency television signal modulated by said modulator to a video displaying apparatus with tuner;
   a searcher for searching an unused channel from among the plurality of channels, said searcher including a determiner to determine a used/unused status for predetermined channels that should be the unused channel;
   a first setter for setting a frequency of the unused channel detected by said searcher to said modulator, said first setter setting a frequency of any one of the predetermined channels based on a result of determination by said determiner;

a presetter for presetting a used channel included in the plurality of channels to said tuner after completing a frequency setting operation by said first setter;

a generator for generating a character signal;

a combiner for combining the character signal generated by said generator with the base-band television signal outputted from said tuner; and a second setter for selectively setting frequencies of the predetermined channels to said modulator at a predetermined time interval.

5. A video recording/reproducing apparatus with tuner according to claim 4, further comprising a controller for controlling said generator to generate a character signal related to a frequency having been set by said second setter.

6. A video recording/reproducing apparatus with tuner according to claim 4, further comprising a third displayer for displaying a channel number of a frequency having been set by second setter.

7. A video recording/reproducing apparatus with tuner, comprising:

a tuner for inputting a plurality of channels of radio frequency television signals and outputting a base-band television signal of a designated channel;

a modulator for modulating the base-band television signal outputted from said tuner;

an outputter for outputting the radio frequency television signal modulated by said modulator to a video displaying apparatus with tuner;

a determiner for determining used channel/unused channel for predetermined channels each of which should be the unused channel out of the plurality of channels;

a first setter for setting to said modulator a frequency of a channel which is determined to be the unused channel by said determiner;

a second setter for selectively setting frequencies of the predetermined channels to said modulator at a predetermined time interval when any of the predetermined channels is determined not be the unused channel by said determiner;

a generator for generating a character signal related to a frequency which is set by said second setter;

a combiner for combining the character signal generated by said generator with the base-band television signal outputted from said tuner;

an acceptor for accepting a selecting operation which selects any one of the predetermined channels in association with a setting process of said second setter; and a third setter for setting to said modulator a frequency of a channel selected by the selecting operation.

8. A video recording/reproducing apparatus with tuner according to claim 7, further comprising a presetter for presetting a used channel included in the plurality of channels to said tuner after completing of a frequency setting operation by said first setter or said third setter.

9. A video recording/reproducing apparatus with tuner according to claim 8, further comprising:

an instructor for instructing suspension of a presetting operation, which is to be enabled after completing of the frequency setting operation by said first setter or said third setter; and a disabler for disabling said presetter in response to an instruction of said instructor.

10. A video recording/reproducing apparatus with tuner according to claim 7, further comprising a first displayer for selectively displaying channel numbers of the predetermined channels at a predetermined time interval when any of the predetermined channels is determined not to be the unused channel by said determiner.

11. A video recording/reproducing apparatus with tuner according to claim 10, further comprising a second displayer for displaying a channel number of a frequency which is set in said modulator by said first setter or said third setter.

* * * * *